United States Patent [19]
Paul

[11] Patent Number: 4,858,428
[45] Date of Patent: Aug. 22, 1989

[54] ADVANCED INTEGRATED PROPULSION SYSTEM WITH TOTAL OPTIMIZED CYCLE FOR GAS TURBINES

[76] Inventor: Marius A. Paul, 969 La Paz, Placential, Calif. 92690

[21] Appl. No.: 855,847

[22] Filed: Apr. 24, 1986

[51] Int. Cl.[4] .............................. F02C 1/06
[52] U.S. Cl. .................. 60/39.17; 60/39.29; 60/39.511
[58] Field of Search .............. 60/39.17, 39.27, 39.29, 60/39.511, 39.161, 39.23

[56] References Cited

U.S. PATENT DOCUMENTS

| | | | |
|---|---|---|---|
| 2,613,500 | 10/1952 | Lysholm | 60/39.17 |
| 2,621,475 | 12/1952 | Loy | 60/39.17 |
| 2,632,297 | 3/1953 | Ogsten | 60/39.17 |
| 2,758,827 | 8/1956 | Pfenninger | 60/39.17 |
| 3,255,586 | 6/1966 | Hennig et al. | 60/39.17 |
| 3,472,487 | 10/1969 | Moellmann | |
| 3,733,815 | 5/1973 | Karol | 60/39.161 |
| 3,765,170 | 10/1973 | Nakamura | 60/39.511 |
| 4,301,649 | 11/1981 | Walker | 60/39.511 |
| 4,357,796 | 11/1982 | Ellis | 60/39.511 |
| 4,414,805 | 11/1983 | Walker | 60/39.161 |
| 4,550,565 | 11/1985 | Ozono | 60/39.27 |

FOREIGN PATENT DOCUMENTS

| | | |
|---|---|---|
| 3217741 | 11/1983 | Fed. Rep. of Germany . |
| 2191116 | 3/1974 | France . |
| WO85/00199 | 1/1985 | PCT Int'l Appl. . |
| 651319 | 3/1951 | United Kingdom ............... 60/39.17 |
| 2118248 | 10/1983 | United Kingdom . |

Primary Examiner—Donald E. Stout
Attorney, Agent, or Firm—Bielen and Peterson

[57] ABSTRACT

A gas turbine system with integrated high and low pressure circuits having a power transmission for extracting work from one of the circuits, the volume of air and fuel to the respective circuits being varied according to the power demand monitored by a microprocessor, wherein the turbine system has a low pressure compressor and a staged high pressure compressor with a combustion chamber and high pressure turbine associated with the high pressure compressor, and, a combustion chamber and a low pressure turbine associated with the low pressure compressor, the low pressure turbine being staged with the high pressure turbine to additionally receive gases expended from the high pressure turbine and a microprocessor to regulate air and gas flows between the compressor and turbine components in the turbine system.

14 Claims, 7 Drawing Sheets

ADVANCED INTEGRATED PROPULSION SYSTEM WITH TOTAL OPTIMIZED CYCLE FOR GAS TURBINES

BACKGROUND OF THE INVENTION

This invention relates generally to an advanced integrated propulsion system (AIPS) for gas turbines, and more particularly, to structural improvements that improve the efficiency of the gas turbines for propulsion or energy.

In general, a propulsion system must have the highest efficiency at variable load, and especially at partial load, in which a vehicle is used for the majority of its life time.

The very high and dramatic variation of the specific fuel consumption is, in fact, the major disadvantage of the gas turbine engine and the Brayton cycle it follows. The gas turbine is, therefore, generally unsuited for applications where power and speed are variable.

Therefore, the gas turbine has ordinarily been used only in applications where the requirements for power and speed are substantially constant.

The superior characteristics of the gas turbine engine for numerous high power applications, both military and commercial, are well known. Low specific weight and fundamental mechanical simplicity particularly favor this type of engine.

Numerous developmental paths are available for reducing the gas turbine engine's fuel and air consumption and for reducing its size and weight. Many of these paths, however, lead to undesired complexity and high cost.

One obstacle in the evolution of the gas turbine engine is the inability to provide a sufficiently high and constant pressure ratio for the compressor without unduly increasing the engine's size and cost. The effects of the compressor's pressure ratio and efficiency on the engine's specific fuel and air consumption are dramatic. Although an increase in the pressure ratio at a given efficiency increases the engine's specific power, a more significant effect is the reduction in specific fuel consumption.

Another obstacle in the evolution of gas turbine engines is the limited heat resistance of the engine's fixed vanes and turbine blades. Complete combustion of petroleum fuels at a stoichiometric ratio with air results in a combustion gas temperature near 4000° F. or 2200° C.). However, the engine components mentioned above cannot ordinarily be heated above 2300° F. (or 1200° C.), without incurring damage. The usual solution to this overheating problem is to dilute the combustion gases with an excess of compressed air, typically three to four times as much air as is required for stoichiometric combustion with the fuel. This dilution reduces the temperature of the combustion gases below the 2300° F. limit, but unfortunately requires power to compress and deliver the additional air and also significantly increases the engine's size.

An afterburner can be used to fully utilize the dilution air mixed in with the combustion gases. This afterburner is located downstream of the engine's turbine, however, such that the pressure of the air delivered to it has been significantly reduced by passage through the turbine, and the afterburner's efficiency is consequently very low. The afterburner is therefore suitable for use in only very limited circumstances, for relatively short time durations, when additional power is required.

The desire to operate at higher combustion gas temperatures is longstanding. Improved metallurgy and fabrication techniques have permitted operation at somewhat higher temperatures, but there is still significant room for further improvement. Increasing the combustion gas temperature at the turbine inlet merely 600° F., from 1700° F. to 2300° F., nearly doubles the power obtained per pound of air flow.

One technique proposed for permitting engine operation at temperatures of about 2300° F. involves cooling the turbine (shrouding, stator, blades and rotor blades) using air diverted from the engine's compressor. Diverting air from the compressor leads to inefficiencies in the thermal cycle, since a portion of the compressed air (probably about eight percent) bypasses the engine's combustion chamber.

It is well known that the cycle efficiency for the gas turbine with heat recovery goes up when the compression ratio goes down.

Also, it is well known that the pressure ratio for maximum output is higher than that of the pressure ratio for maximum efficiency.

A very important factor which determines the optimum level of the compression ratio is the Cycle Temperature Ratio, $$T' = \frac{T \max}{T_{o'}} = \frac{\text{Turbine Inlet Temperature}}{\text{Compressor Inlet Temperature}}$$

By raising T', the specific power and the efficiency go up for each optimum pressure ratio.

The maximum T' corresponds with the stoichiometric ratio, which is a theoretically absolute limit for the evolution of the gas turbine.

One well known method to raise the specific work of the turbine cycle is by reheating the gases before they are expanded in the power turbine, which is counter productive in some ways because of the following considerations:

a. More air must be bled from the compressor to cool the hotter power turbine blades, and the effective mass flow through the compressor turbine will be reduced.

b. The practical reheat fuel/air ratio will be far less effective, because the fuel is not burnt in the air but in the combustion gases from the main combustion chamber.

c. The gain in efficiency, due to the reheat obtained with the ideal cycle is not realized in practice, partly because of the additional pressure loss in the reheat chamber.

Today the state-of-the-art technology of the gas turbine is far below the stoichiometric limit.

An example for a modern gas turbine with heat recovery, is defined by the following data:

$$T' = \frac{T \max}{T_o} = \frac{1462° - k}{303} - \frac{1120}{303} = 4.8 - 3.69$$

Pressure ratio = 13.75 − 5.75
Degree of recovery R = 0.61 − 0.66
Thermal efficiency nth = 0.2811 − 0.1915
Effective efficiency $n_e$ = 0.2769 − 0.1885
Specific fuel consumption = 0.495 − 0.725 lb/HPh
Specific power = 127 − 48 HP/lb air sec.

It should be appreciated that there is a significant need for a gas turbine engine that avoids the problems identified above, in particular, the poor efficiency and the high specific fuel consumption and the dramatic deterioration of the efficiency at part load.

In particular, there is a need for an engine that combusts fuel and air near the stoichiometric ratio, and that can operate at maximum efficiency for a wide range of loads. The present invention fulfills these and other needs.

The integration of these gas turbines with a power transmission, under the control of a microprocessor programmed to optimize the energetic cycle of the gas turbine with the requirements of the *power-user* is the final object of this invention.

SUMMARY OF THE INVENTION

The present invention is embodied in an improved gas turbine that can partially or totally combust fuel and air at the stoichiometric value.

The engine is significantly smaller than previous engines of comparable power, and requires significantly reduced amounts of both fuel and air.

The gas turbine engine of this invention includes basically two cycles associated in a ratio, defining the air/fuel quantity, which is combusted in each cycle in parallel. In accordance with the invention, all the air is compressed only in a low pressure compressor, from which the air flow is divided, diverting one part to a low pressure cycle and the second part to a high pressure cycle.

FIRST EMBODIMENT

The first part of the air for the low pressure cycle is routed through a low pressure heat recovery system to a low pressure combustion chamber, and on through to a junction-valve. The low pressure combustion gases are associated and mixed with the rest of the gases which result from the high pressure cycle in a converging chamber before entering the power turbine (last expansion).

The remaining part of the air for the high pressure cycle is further compressed in the high pressure compressor, and is routed through a high pressure heat recovery system, to a high pressure combustion chamber: It is then expanded through the gasifier turbine (high pressure turbine) which drives all the compressors, in the same converging chamber, and is mixed with the gases produced by the low pressure cycle. Together they are expanded in the power turbine (lowest pressure turbine). From the last stages of the turbine, the gases are ducted by two branches in two separate sections of the heat recovery system.

One exchanging the heat with the low pressure air belonging to the low pressure cycle, and the second exchanging the heat with the high pressure air, belonging to the high pressure cycle.

The last heat recovery process is in the third section of the heat recovery system in which the fuel is preheated by exhaust gases (by a gas-liquid recuperator) returning to the general associated cycle more heat and raising the over all efficiency of the turbine.

For low grade fuel, in which the low heat value is very small, the heat recovered from the exhaust gases is very important, because of the large amount of liquid which absorbs the energy from the exhaust gases.

SECOND EMBODIMENT

The low pressure cycle is similar to the first embodiment. The remaining air for the high pressure cycle is further compressed in the high pressure compressor, and is ducted through a high pressure heat recovery system to a high pressure combustion chamber and expanded through the power turbine. The gas then goes to the same converging chamber, and is mixed with the gases produced by the low pressure cycle, and then finally expanded in the gasifier turbine which drives the compressors.

THIRD EMBODIMENT

Similar to the first and second embodiments, except by the fact that the combustion chambers for both cycles are surrounding the turbine, the turbine's blades are internally cooled by a mixture formed of air and liquid (fuel), permitting a high intensive, cooling-recovering process of the blades, which in turn allows the turbine temperature near the stoichiometric value. The air and the liquid (fuel), which cooled the interior of the blades by internal convection, evaporation and heat recovery from the turbine blades, occurs in narrow passages of its interior, terminating in an outlet peripheral ports, discharging the cooling liquid (fuel) and cooling air directly in to the peripherical combustion chamber. This process recovers totally the energy for cooling, conducted by the compressed air and the cooling fluid.

For his reason the combustion chamber is preferably annular and configured to encircle the turbine, with the remote tips of the turbine formed in a peripheral shroud, which is located in direct contact with the combustion chamber. This configuration provides that the turbulent mixture of liquid and air are injected directly into the combustion chamber at high speed and in a good arrangement for final mixture and perfect combustion.

All the stages of the low pressure cycle can be raised to the stoichiometric level, based on the fact that the expanded gases from the high pressure cycle, are cooled by expansion. For this reason, the gases incoming from the low pressure cycle can be at the highest stoichiometric level by mixing in the converging chamber, the final temperature of the gases which are expanded in the last stages of the turbine (all the stages) can be at a very acceptable level.

In general, the low pressure ratio and in particular the low pressure associated cycle, achieves a very high level of heat recovery (over 90%), together with a very high turbine inlet temperature. The thermal efficiency of all the engine is at a very high level, reaching values over 50%, with a maximum of over 60%.

In some stages of the invention, the cooling liquid also includes water, or a combination of water and different fuels, such that the high speed superheated steam is produced inside of the turbine blades and ejected directly into the combustion chamber through the tips of the turbine blades. This steam dilutes the combustion gases and lowers in a controllable way, the maximum temperature, and the NOX formation (in a like manner it also provides a Rankine Cycle through the internal cogeneration). The result is a compact structure that simultaneously produces both a Brayton Cycle and a Rankine Cycle. The engine can further include means for controlling and adjusting the relative amounts of the fuel and water injected into the turine blades. Or, alternatively, the cooling liquid can include water only.

The amount by which the turbine blades and stator vanes, in both associated cycles, must be cooled depends, of course on the load imposed on the engine, and the distribution of this load between the associated cycles, and the resulting temperature of the combustion gases in each cycle. Under full load, a maximum amount of cooling liquid is injected, whereas under relatively small loads, only air is injected.

In this situation the fuel or the liquid for cooling is preheated in the exhaust heat recovery system, improving the overall efficiency of the system.

Comparative with the existing—reheat method, our low pressure—associated cycle—is far superior for many reasons:

a. The fuel is burned in clean air, with an unlimited capacity to use all the air until the stoichiometric level is reached.

b. The pressure loss is far inferior in the second combustion chamber because of the large cross section and less mass flow.

c. The mixture between the hot gases produced in the low pressure cycle are made in the converging chamber at the isobar condition, producing a reheat for the expanded gases which is produced in the high pressure cycle without any losses.

d. At least a big part of the fuel air corresponding to the air of the low pressure cycle can be completely burned at the stoichiometric level. This is a vehicle of heat which through mixing reheats the gases produced in the high pressure cycle.

One important component of the invention, the regulating means maintains the maximum temperature of the combustion gases at a substantially constant value for all levels of the variable loads. This is correlated with the optimum pressure ratio and provides a high thermal efficiency even while driving relatively small loads.

The elasticity of this regulation is allowed by the relative independence of the associated cycle, which can be correlated in an optimum way.

In this embodiment, the regulating means includes, variable guide vanes for each section of the compressor, each section of the turbines, and the junction-valve, which; adjusts the flow rate of the compressed air and the distribution of the air between the low and high pressure cycles, defining for each load the association between the cycles.

The regulating means are under the control of a microprocessor system, which is programmed for each particular regime (speed or/and torque) to maintain the optimized correlation of all factors which maximize the efficiency, the power, or both.

BRIEF DESCRIPTION OF THE DRAWINGS

While the specification concludes with claims particularly pointing out and distinctly claiming the subject matter of the present invention, the invention will be more fully understood from the following description of the preferred embodiments, which are given by way of example with the accompanying drawings in which:

DESCRIPTION OF THE PREFERRED EMBODIMENTS

With reference to the drawings, for purposes of illustration, there are shown a number of alternative embodiments of a gas turbine engine of the present invention.

Although each embodiment has its unique features, in general each of the embodiments has a substantial similarity to each other. In all of the drawings similar elements are identified by the same reference numerals.

Figure 1:
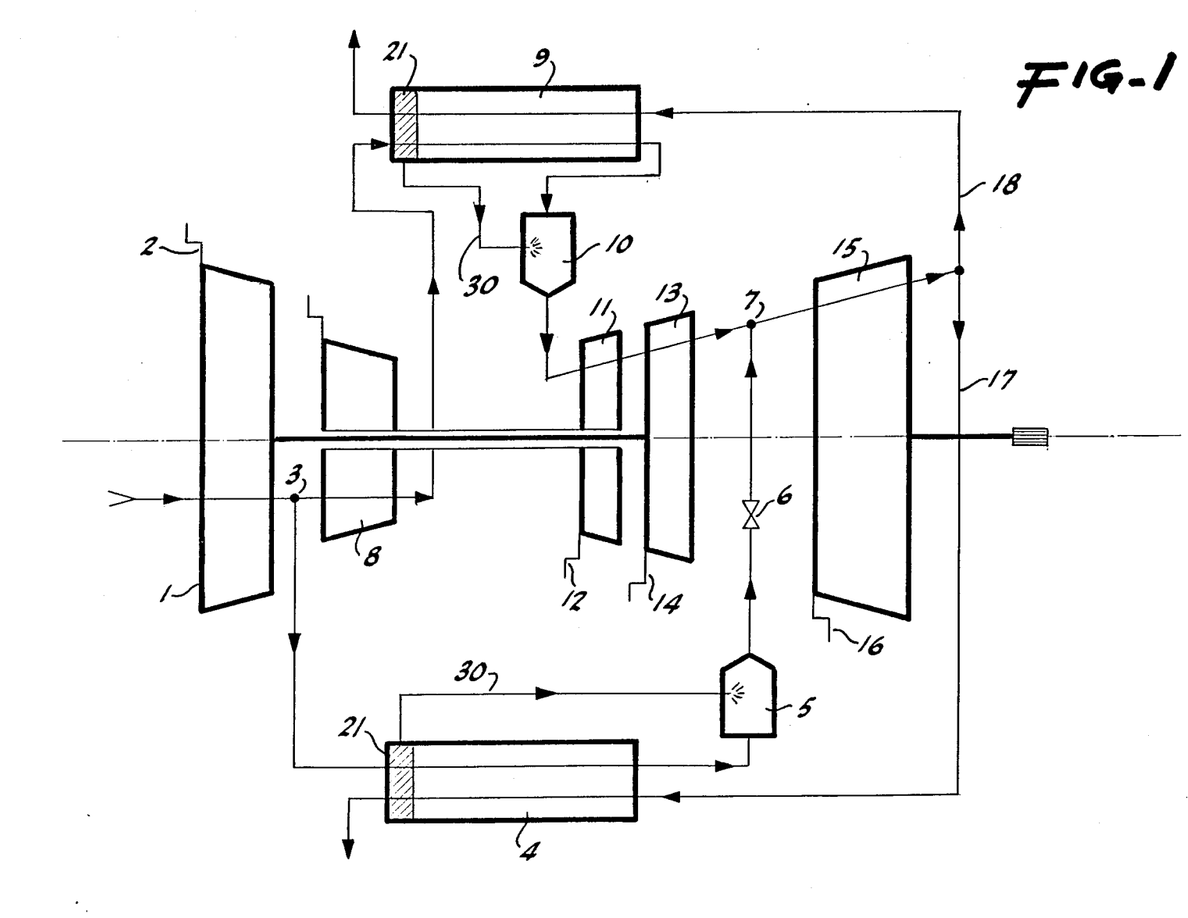
FIG. 1 is a schematic drawing showing the energetic scheme of the associated cycle with the low pressure power turbine.
Figure 2:
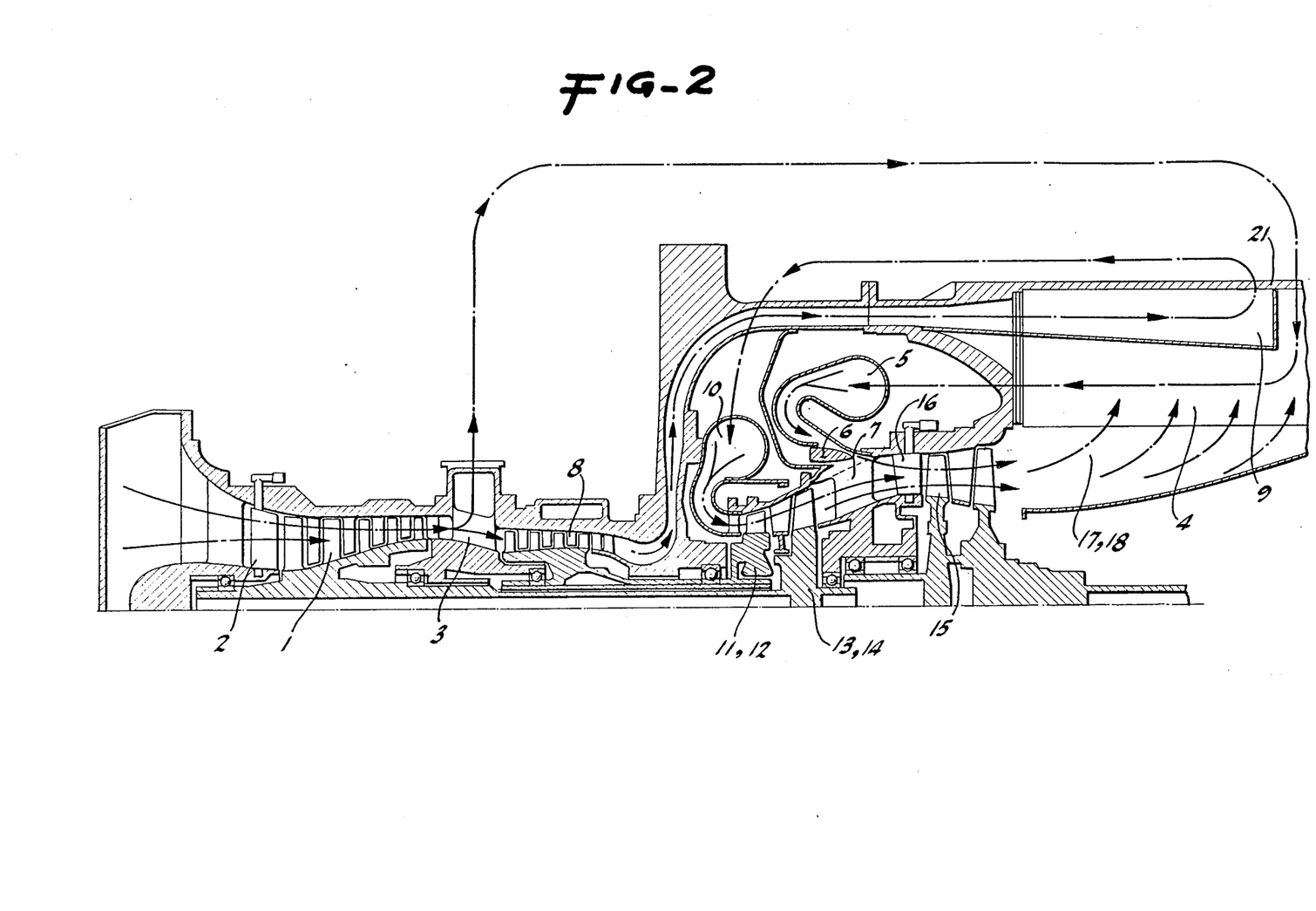
FIG. 2 is a cross-sectional view of a gas turbine with associated cycle in relation with FIG. 1.

FIGS. 1 and 2 illustrate one example of a gas turbine with associated cycles, with a low pressure power turbine. The low pressure cycle includes a low pressure compressor "1", with adjustable prewhirl blade "2", a diverting chamber "3", from which the low pressure air is divided into two branches, one is conducted through the low pressure heat exchanger "4", to the low pressure combustion chamber "5", continuing its flow through the junction value "6", then is conducted in the converging chamber "7", in which the combusted gases from the low pressure cycle are isobarically mixed with the expanded gases issued from the high pressure turbine.

The high pressure cycle includes a high pressure compressor "8" which compresses the remaining air, through the high pressure heat exchanger "9", to the high pressure combustion chamber "10", from which the gases are expanded through the high pressure turbine "11", and "13" provided with variable guide vanes "12" and "14", and isobarically mixed with the low pressure gases in the converging chamber "7", in which the hot gases, from the low pressure cycle, reheat the expanded gases form the high pressure cycle, by mixing and direct heat transfer. The unified gas flow with a unique temperature is finally expanded through the power turbine "15" from which the exhaust gases are divided into two branches, "17" for low pressure heat exchanger "4", and "18" for high pressure heat exchanger "9".

Figure 3:
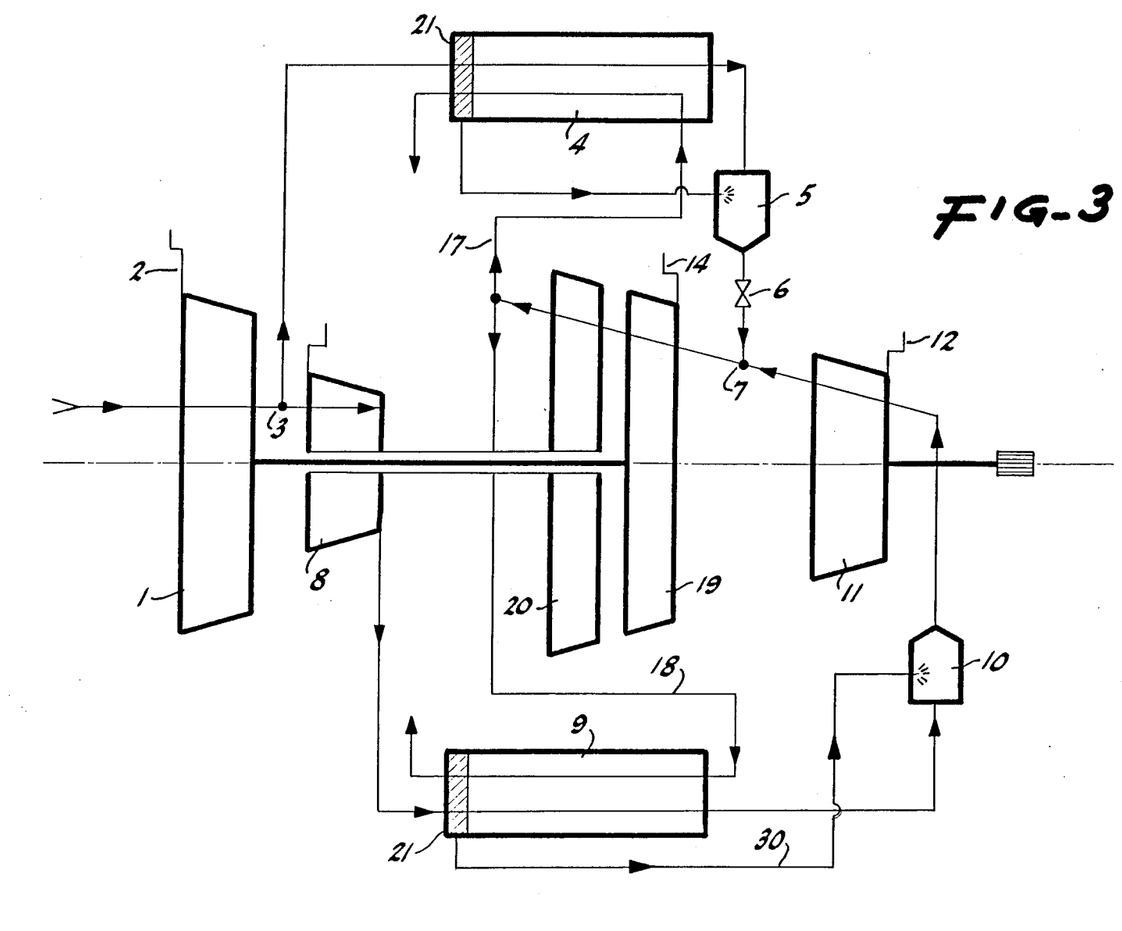
FIG. 3 is a schematic drawing showing the energetic scheme of the associated cycle, with a high pressure power turbine.
Figure 4:
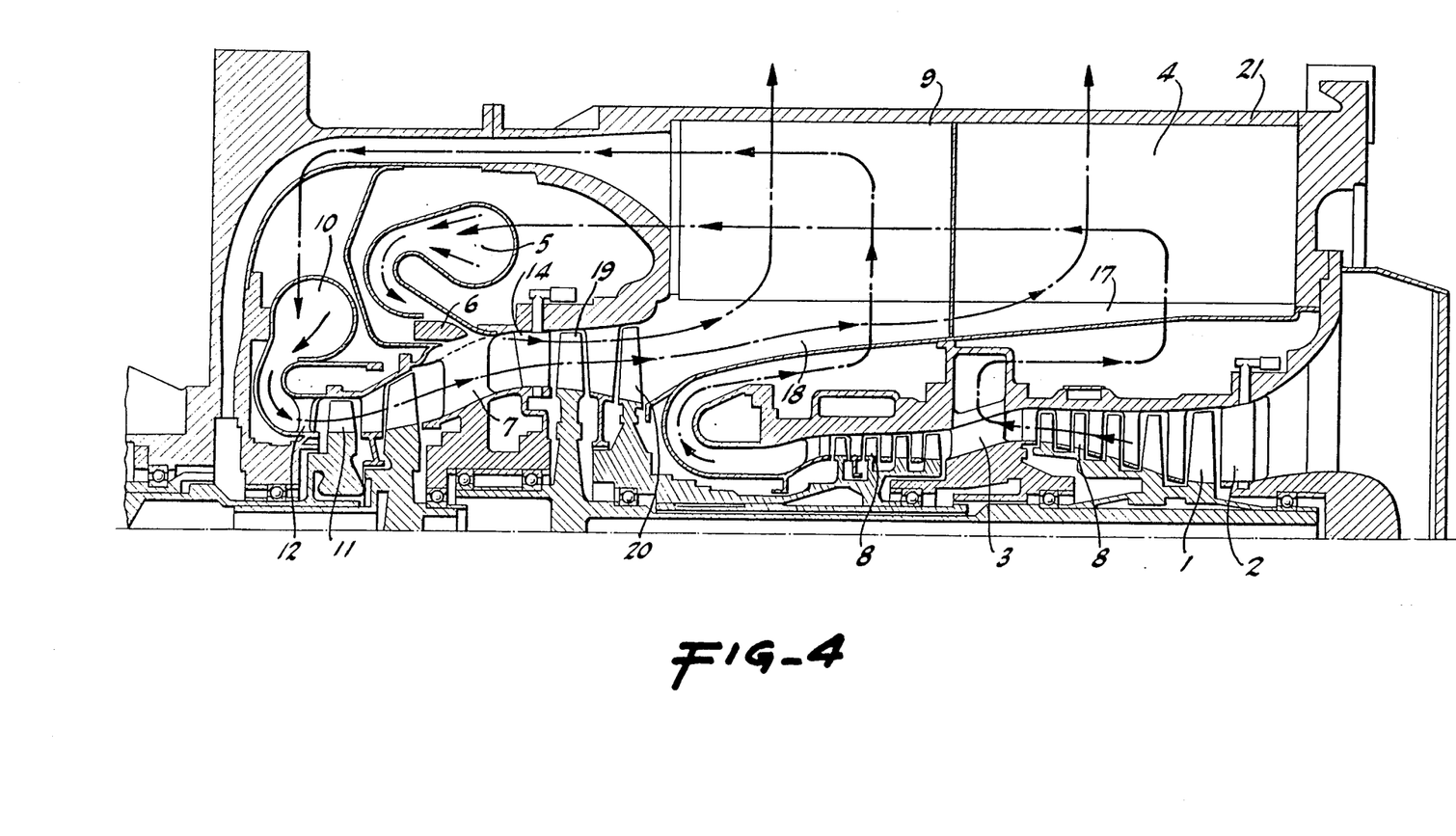
FIG. 4 is cross sectional view of gas turbine with associated cycle, in relation with FIG. 3.

FIGS. 3. and 4. depict one example of a gas turbine with associated cycles, embodying the present invention, with a high pressure power turbine.

The low pressure cycle includes a low pressure compressor "1", with adjustable prewhirl blades "2", a diverting chamber "3", from which the low pressure air is divided into two branches. One is conducted through the low pressure heat exchanger "4", to the low pressure combustion chamber "5", from which the gas flows through the junction value "6", is conducted into the converging chamber "7", in which the combusted gases from the low pressure cycle are isobarically mixed with the expanded gases, issued from the high pressure turbine "11".

The high pressure cycle includes a high pressure compressor "8", which compresses the remaining air through the high pressure heat exchanger "9" to the high pressure combustion chamber "10". The gases are then expanded through the high pressure power turbine "11", provided with variable guide vane "12", and are isobarically mixed with the low pressure gases in the converging chamber "7", in which the hot gases from the low pressure cycle, reheat the expanded gases from the high pressure cycle, by mixing and direct heat transfer.

The unified gas flow with a unique temperature is finally expanded through the gasifier turbines "19" and "20", from which the exhaust gases are divided into two branches, one "17" for low pressure heat exchanger "4", and "18" for high pressure heat exchanger "9", and finally into the liquid-gas heat exchanger, "21".

Figure 5:
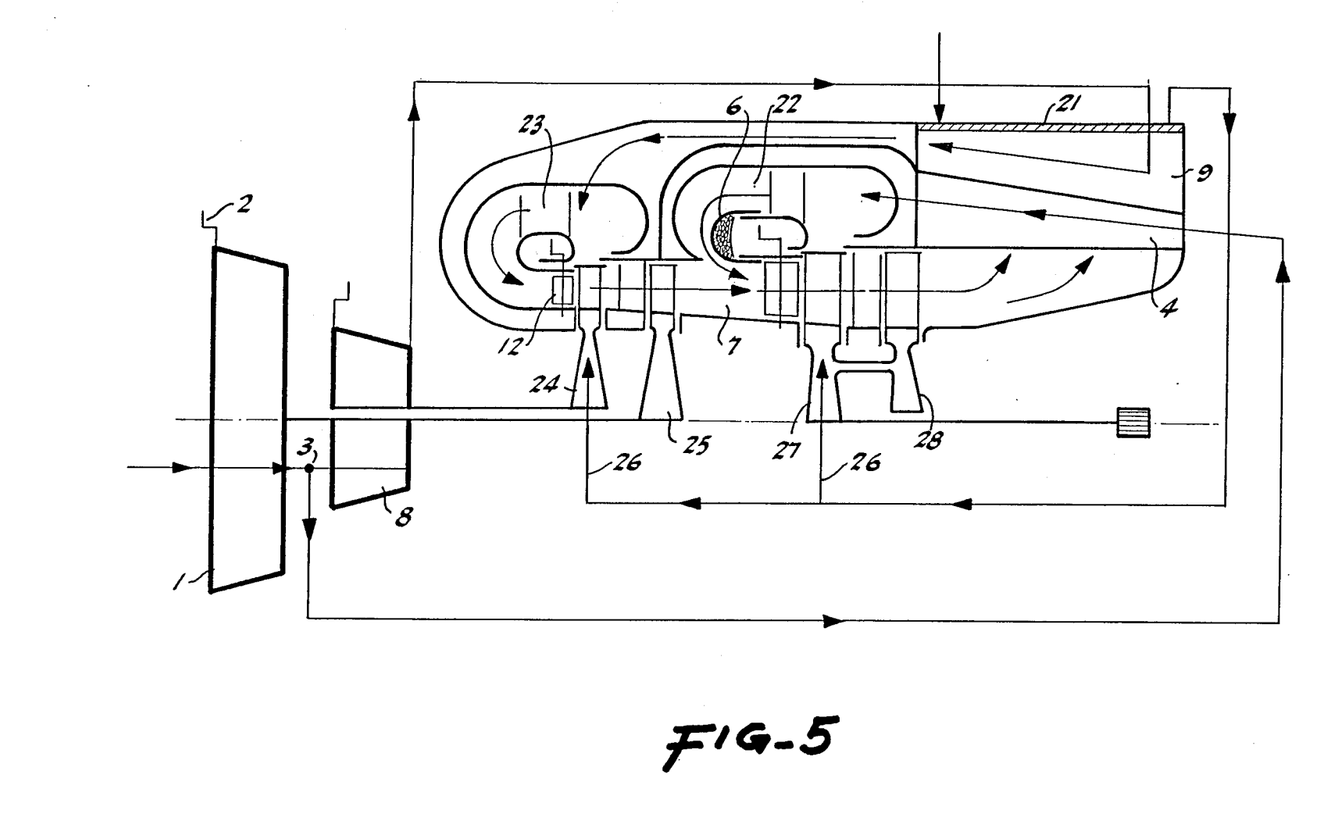
FIG. 5 is a cross sectional view, of a gas turbine with associated cycle, cooled by air, liquid and turbo-annular combustor.

FIG. 5. depicts one example of a gas turbine with associated cycles, embodying the present invention cooled by air and liquid and turbo-annular combustion chamber.

The low pressure cycle includes a low pressure compressor "1", with adjustable blades "2", a diverting chamber "3", from which the low pressure air is divided into two branches; one is conducted through the low pressure heat exchanger "4", to the low pressure turbo-annular combustion chamber "22", from which through the junction value "6" is conducted in the converging chamber "7", in which the combusted gases from the low pressure cycle are isobarically mixed with the expanded gases, issued from the high pressure turbine "24" and "25".

The high pressure cycle includes a high pressure compressor "8", which compresses the remaining air, through the high pressure heat exchanger "9", to the high pressure combustion chamber "23", from which the gases are expanded through the high pressure turbine "24", which is cooled by air and liquid injected inside of an interior passageway 29 by the injection system "26", the high pressure turbine is provided with variable guide vane "12". The liquid fuel and the air, by interior cooling are vaporized, mixed and ejected by the remote tips of the blades in the turbo-annular chamber "23", in which by final mixing, are burnt and expanded through the high pressure turbines, and isobarically mixed with the low pressure gases in the converging chamber "7", in which the hot gases from the low pressure cycle reheat the expanded gases from the high pressure cycle by mixing and direct transfer. A unified gas flow at a unique temperature is finally expanded through the power turbine "27" and "28", which is also cooled by air and liquid injected by the injection system "26" inside of the interior passageway 29. After evaporation and premixing, the air and liquid fuel are ejected by the remote tips of the blades into the turbo-annular combustion low pressure chamber "22".

In both the combustion chambers, the air/fuel ratio can reach the maximum stoichiometric level, providing the gas turbine with a maximum power density and a maximum efficiency.

After final expansion the exhaust gases are conducted through the low and high pressure heat exchanger, "4" and "9", and finally through the liquid gas heat exchanger "21".

Figure 7:
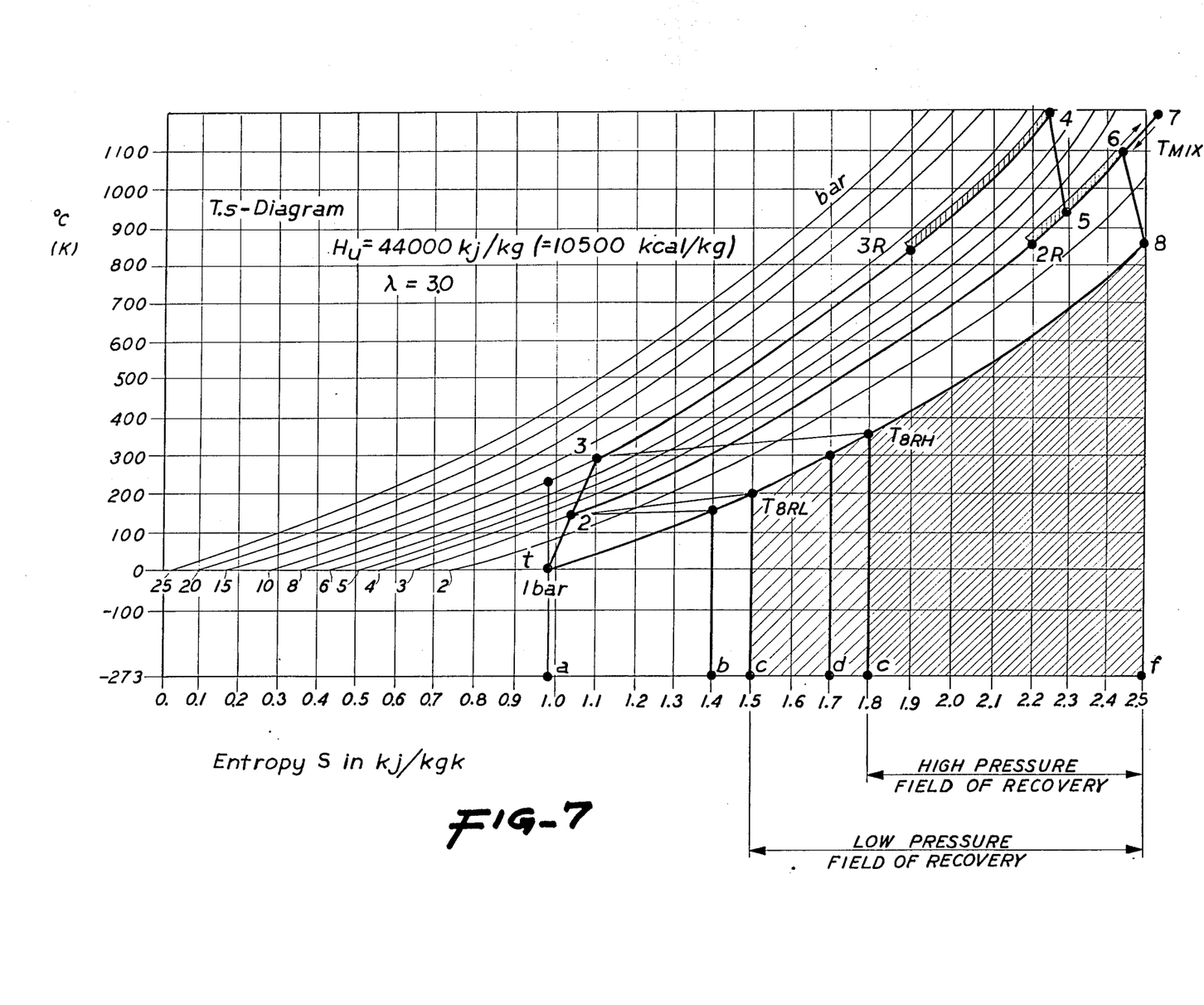

In the temperature-entropy diagram of FIG. 7, the fields of energy recovery for each of the cycles is shown. The low pressure cycle follows the path 1-3-3R-4-5-6-8-8RH-1. The mixing process of the high pressure turbine exhaust gases occurs in the cycle steps 5-7-6. In the FIG. 1 embodiment the power turbine energy is represented by steps 6-8 since output work is extracted from the low pressure turbine cycle. Similary in the FIG. 3 embodiment the power turbine energy is represented by steps 4-5 since output work is extracted from the high pressure turbine cycle.

In the advanced integrated system of separate low and high pressure cycles, different quantities and in fact different qualities of fuel can be burned in each of the separate cycles. Since it is desirable to optimize the operation of the integrated system according to the load, which may be variable in nature, coordinated control of the two cycles must be effected.

As the discharging and governing system for regulating the association between the high and low pressure cycles includes variable guide vanes for the low pressure and high pressure compressors, variable guide vanes for the low pressure and high pressure turbines, diverter or junction valves for dividing the compressed air between cycles and the exhaust gases between heat exchangers, control of such regulating means is best performed by a microprocessor system programmed to maintain the optimized correlation of all factors which maximize the efficiency, the power or both.

Figure 6:
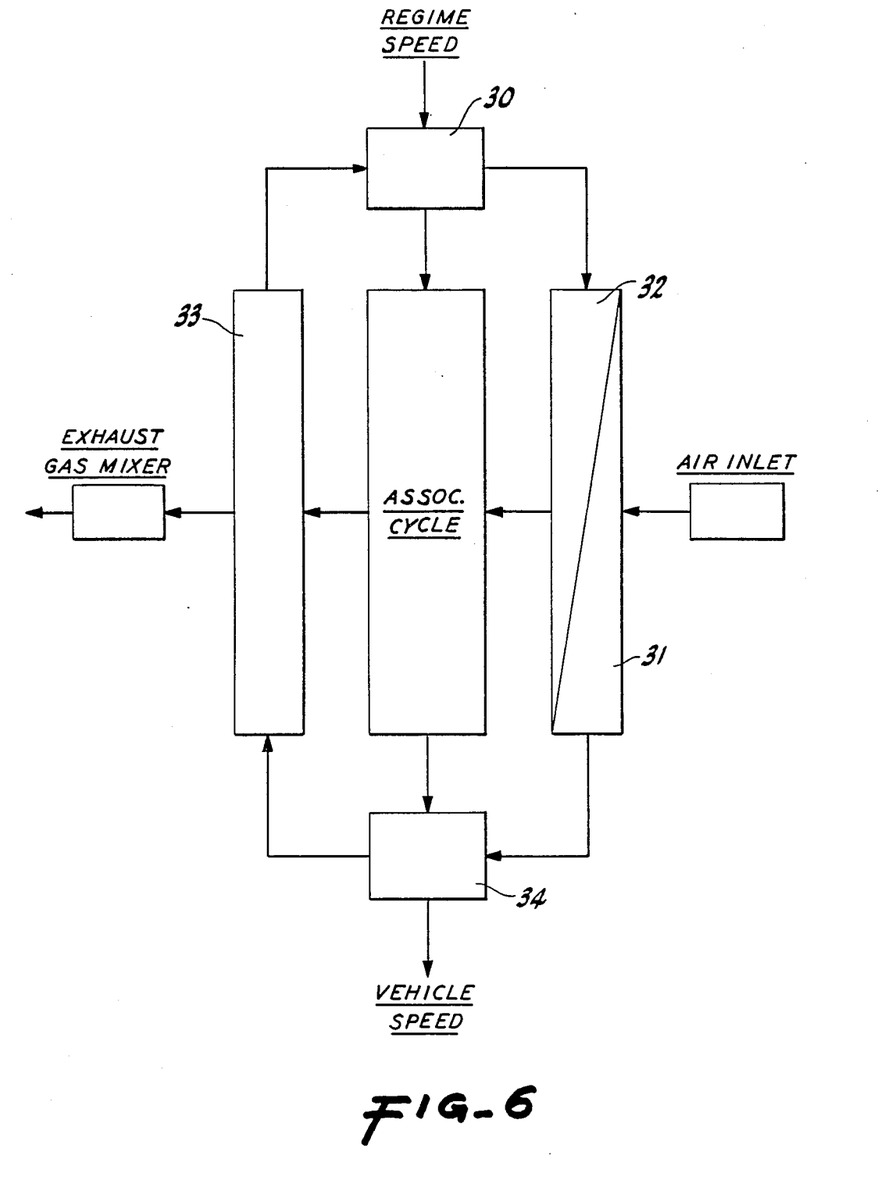
FIG. 6 is a block diagram of a control system for the advanced integrated propulsion system with total optimized associated cycle for gas turbine.

Since such control systems, though sophisticated, are well known in the art of advanced engine system, the system is depicted schematically in the block diagram of FIG. 6.

The system includes a microprocessor 30 with an internal optimized cycle program, an inlet data acquisition system 31 for sensing inlet conditions and input demands, a servo-block 32 for regulating the adjustable vanes and valves, an exit data acquisition system 33, for monitoring output conditions and an inter-lined transmission 34 through which power is delivered to meet the load demands.

I claim:

1. A gas turbine assembly with integrated high and low pressure circuits comprising:

a low pressure air compressor and a high pressure air compressor staged with the low pressure air compressor;

a first high pressure combustion chamber and associated two-stage, high pressure turbine communicating with the high pressure combustion chamber, the two-stage high pressure turbine having a first stage coupled to the high pressure air compressor and a second stage coupled to the low pressure air compressor;

a second low pressure combustion chamber and associated low pressure, power turbine being staged with the high pressure turbine to receive combustion gases expended from the high pressure turbine;

diverting means between the low pressure compressor and the high pressure compressor for diverting compressed air from the low pressure compressor to the low pressure combustion chamber;

a converging chamber between the low pressure combustion chamber and the low pressure, power turbine constructed to receive and combine combustion gases from the low pressure combustion chamber and exhaust gases from the high pressure turbine;

a junction valve between the low pressure combustion chamber and the covering chamber, the valve being regulatable according to power and efficiency requirements of the turbine assembly to vary the flow of compressed air from the low pressure compressor to the low pressure combustion chamber;

transmission means for extracting mechanical output power, wherein the transmission means for extracting mechanical power is connected to the low pressure power turbine and the high pressure turbine drives the compressors; and, fuel supply means for supplying fuel to said first and second combustion chambers wherein a fuel and compressed air mixture is combusted and passed through said turbines.

2. The gas turbine assembly of claim 1 wherein the fuel supply means supplies fuel and coolant to the turbines.

3. The gas turbine assembly of claim 1 wherein the fuel supply means is adapted to separately supply different quantities and qualities of fuels to each turbine.

4. The gas turbine assembly of claim 1 wherein the low pressure turbine receives combustion gases from the high pressure turbine mixed with combustion gases from substantially stoichiometric combustion in the low pressure combustion chamber in a predetermined mixture ratio calculated to produce a gas mixture of permissible temperature for inlet to the low pressure turbine.

5. The gas turbine assembly of claim 1 wherein the combustion chambers are annularly arranged around their associated turbines and the turbines have rotor blades at least a portion of which have peripheral tips communicating with the annular combustion chambers and internal blade passages with outlet ports at the blade tips for ejecting blade coolant passed through the blades, directly into the combustion chambers.

6. The gas turbine assembly of claim 5 wherein the coolant is from the group of air, fuel and water.

7. The gas turbine assembly of claim 5 wherein the coolant is a mixture of substances from the group of air, fuel and water.

8. The gas turbine assembly of claim 1 wherein the low pressure turbine ejects exhaust gases and said assembly includes heat recovery means for extracting thermal energy from the exhaust gases.

9. The gas turbine assembly of claim 1 having control means for regulating the compressed air flow and fuel supply to the combustion chambers according to power demand.

10. The gas turbine assembly of claim 9 wherein the control means includes a microprocessor with input and output sensor means.

11. The gas turbine assembly of claim 10 wherein the control means includes servo means with variable guide vanes for the low pressure compressor, variable guide vanes for the high pressure compressor, variable guide vanes for the low pressure turbine and variable guide vanes for the high pressure turbine.

12. The gas turbine assembly of claim 11 wherein the control means automatically operates the servo means for optimum power and efficiency in the operation of the turbine assembly.

13. The gas turbine assembly of claim 1 wherein the low pressure turbine has a gas exhaust chamber with exhaust dividing means for dividing the exhaust gas into two gas streams, and the turbine assembly has further heat exchanger means in association with the low and high pressure compressors for heating compressed air prior to entry into the combustion chambers.

14. The gas turbine assembly of claim 1 wherein the fuel supply means includes a heat exchanger for preheating fuel.

* * * * *